United States Patent [19]

Takahashi et al.

[11] Patent Number: 5,097,011
[45] Date of Patent: Mar. 17, 1992

[54] PROCESS FOR PREPARING ACRYLONITRILE POLYMER FILM

[75] Inventors: Hiroshi Takahashi; Teruhiko Sugimori; Kunihiro Aoki, all of Ohtake; Hajime Itoh, Hiroshima, all of Japan

[73] Assignee: Mitsubishi Rayon Company, Limited, Tokyo, Japan

[21] Appl. No.: 417,459

[22] Filed: Oct. 5, 1989

[30] Foreign Application Priority Data

Oct. 13, 1988 [JP] Japan .................. 63-257679

[51] Int. Cl.$^5$ .................. B29D 7/01; C08F 20/44
[52] U.S. Cl. .................. 528/491; 528/492; 528/499; 528/502; 526/220; 526/341; 525/242; 525/243; 525/260; 264/216; 264/234; 264/291; 264/331.1; 264/345
[58] Field of Search ............ 526/341, 342, 222, 220; 525/242, 243, 260; 264/216, 234, 291, 331.16, 345; 528/491, 492, 499, 502

[56] References Cited

U.S. PATENT DOCUMENTS

| | | | |
|---|---|---|---|
| 2,787,610 | 4/1957 | Janssen .................. | 526/341 X |
| 3,320,221 | 5/1967 | Wishman et al. .......... | 526/342 X |
| 3,373,147 | 3/1968 | Izumi et al. ............. | 526/222 X |
| 3,437,717 | 4/1969 | Isley et al. .............. | 525/305 X |
| 3,574,177 | 4/1971 | Nakajima et al. ......... | 526/341 X |
| 3,697,492 | 10/1972 | Champ et al. ........... | 526/341 X |
| 3,963,687 | 6/1976 | Saxton .................. | 526/66 |
| 4,066,731 | 1/1978 | Hungerford ............ | 264/216 |

FOREIGN PATENT DOCUMENTS

| | | | |
|---|---|---|---|
| 0098572 | 7/1983 | European Pat. Off. . | |
| 0180975 | 5/1986 | European Pat. Off. .... | 526/342 |
| 2405275 | 10/1977 | France . | |
| 10996 | 7/1961 | Japan . | |
| 61-163940 | 7/1986 | Japan . | |
| 1-272609 | 10/1989 | Japan .................. | 526/342 |
| 1136928 | 12/1965 | United Kingdom . | |

*Primary Examiner*—Fred Teskin
*Attorney, Agent, or Firm*—Oblon, Spivak, McClelland, Maier & Neustadt

[57] ABSTRACT

An acrylonitrile polymer film is disclosed which film comprising a polymer containing higher than 80% by weight of acrylonitrile units, having higher than 300,000 of weight average molecular weight, and having molar fraction Ne for the segment of polymerization initiator bonded to the terminal of the polymer satisfying the following equation:

$$Mw \times Ne \leq 400$$

1 Claim, 1 Drawing Sheet

PROCESS FOR PREPARING ACRYLONITRILE POLYMER FILM

BACKGROUND OF THE INVENTION

1. Field of the Invention

The present invention relates to a novel acrylonitrile polymer film excellent in gas barrier property, weather proofness, heat resistance, chemical resistance and transparency, as well as having extremely high strength.

2. Description of the Prior Art

Heretofore, as the acrylonitrile polymer film, there have been generally known a film of a copolymer of acrylonitrile with methyl acrylate, butadiene, styrene or like other monomer. By the term "film" is meant film, sheet and the like, in the present invention.

The film of acrylonitrile homopolymer is described in U.S. Pat. No. 4066731.

However, there are shortcomings that the film of the copolymer as described above generally has no sufficient mechanical strength, and when the copolymer has a high content of the comonomer, the gas barrier property, weather proofness, heat resistance, chemical resistance and transparency of the film are reduced.

In addition, there has been also a defect that the homopolymer film described in U.S. Pat. No. 066731 has no sufficient mechanical strength.

SUMMARY OF THE INVENTION

The object of the present invention is to overcome the foregoing problems and provide an acrylonitrile polymer film in which the gas barrier property, weather proofness, transparency, heat resistance and chemical resistance inherent to the acrylonitrile polymer are shown to the utmost degree and also having extremely high strength. Further object of the present invention is to provide a process for preparing such film.

As a result of studies on acrylonitrile polymer films, it has been found that an acrylonitrile polymer film having an extremely high strength can be obtained with a certain type of acrylonitrile polymer.

The present invention relates an acrylonitrile polymer film comprising a polymer containing higher than 80% by weight of acrylonitrile units, having higher than 300,000 of weight average molecular weight, and having molar fraction Ne for the segment of polymerization initiator bonded to terminals (ends) of the polymer molecule satisfying the following equation:

$$Mw \times Ne \leq 400$$

Also, the present invention concerns a process for preparing such film.

DETAILED EXPLANATION OF THE INVENTION

Figure 1:
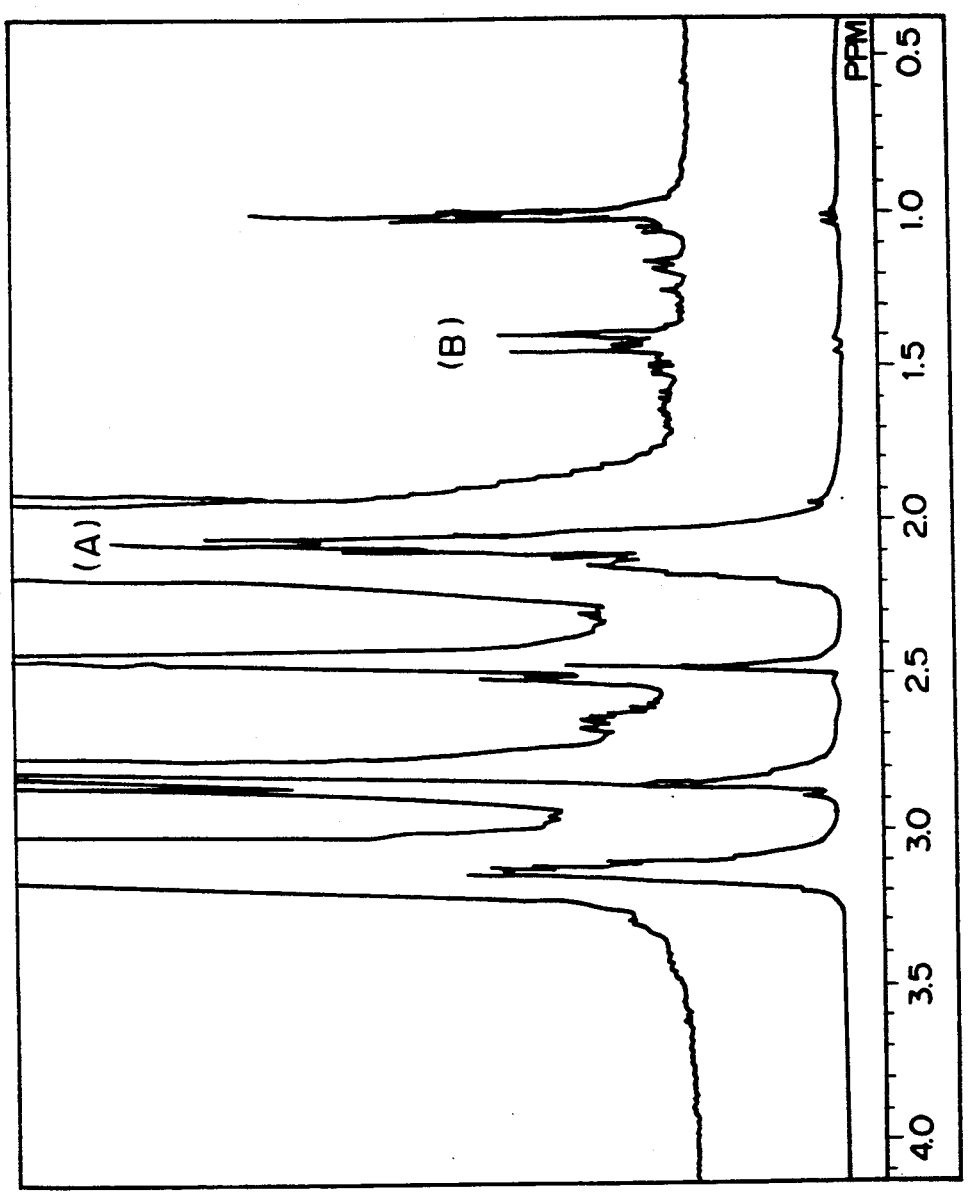
FIG. 1 shows NMR spectrum for measuring the molar fraction.

The acrylonitrile type polymer used in the present invention is a homopolymer or copolymer of acrylonitrile or a mixture of them with an other polymer. Exemplary comonomer polymerizable with acrylonitrile are vinyl carboxylic acids such as acrylic acid, methacrylic acid, itaconic acid and maleic acid, and esters thereof; vinyl halides such as vinyl chloride and vinylidene chloride; vinyl amides such as acrylamide and methacrylamide; vinyl esters such as vinyl acetate and vinyl lactate; aromatic vinyl compounds such as styrene and vinylpyridine, vinyl sulfonic acids such as allyl sulfonic acid and methallyl sulfonic acid; and olefins such as ethylene and propylene. These comonomer may be used alone or as a combination of two or more of them. Further, the acrylonitrile polymer may be a mixture with a polymer comprising the comonomer described above.

The content of the acrylonitrile unit in the acrylonitrile polymer gives a remarkable effect on the gas barrier property, weather proofness, heat resistance, chemical resistance and transparency of the film. Since the properties of the acrylonitrile polymer can be improved as the content of acrylonitrile becomes greater, the content of the acrylonitrile unit is preferably higher than 80% by weight, more preferably higher than 95% by weight and, particularly preferably, it is an acrylonitrile homopolymer.

The weight average molecular weight of the acrylonitrile polymer used in the present invention is higher than 300,000 and, more preferably, higher than 500,000. The film of the acrylonitrile polymer having lower molecular weight show poor mechanical property, particularly, tensile strength or impact strength. Further, it is difficult to give a high strength by stretching to the film with the polymer having the molecular weight lower than the above-mentioned range.

In the acrylonitrile polymer usable for the present invention, molar fraction Ne for the segment of a polymerization initiator bonded to terminals or ends of the polymer molecules satisfies the following equation:

$$Mw \times Ne \leq 400$$

This index shows the degree of branching in the polymer molecule and, if the value: $Mw \times Ne$ exceeds 400, stretchability of the film is reduced to bring about a difficulty in the development of high strength in the film.

As a process for preparing the polymer of high molecular weight with less branching used in the present invention, a method as described in Japanese Patent Application 103482/1988 is preferably used, wherein a mixture of water and an organic solvent is used as polymerization medium and an acrylonitrile polymer is added in the medium as a seed polymer upon starting the polymerization. Disclosure of the Application is herein incorporated by reference.

The thickness of the film according to the present invention may properly be selected depending on the purpose of use and it is, preferably, within a range from 0.5 to 500 μm and, more preferably, within a range from 1 to 100 μm.

If the thickness of the film is less than the above-mentioned range, the film lacks in rigidity and shows poor handlability. On the other hand, if it is too thick, flexibility of the film is lost, suffering from the restriction to end use of the film.

Breaking strength of the film according to the present invention in at least one direction is preferably higher than 20 kg/mm$^2$, more preferably, higher than 25 kg/mm$^2$.

Referring to the directionality of the strength of the film according to the present invention, if the film has a high strength only in one particular direction, it can be used as an easily cutting film due to its nature tending to be torn in that direction and such a film can be obtained by stretching an unstretched film in monoaxial direction.

Further, in a case where the film has high strength at any direction, it can be used as a high strength film with no anisotropy for gas barrier film, various kind of base films. Such a film can be obtained, for example, by simultaneous biaxial stretching of an unstretched film.

Oxygen permeability showing the degree of the gas barrier property of the film according to the present invention is preferably lower than $3 \times 10^{-14}$ $cm^3 \cdot cm/cm^2 \cdot sec \cdot cmHg$.

The film according to the present invention can be used as a single layer or in lamination with other resin layer or thin metal film layer, or by molding with such a layer depending on the purpose of use.

As a process for preparing the film according to the present invention, known cast-stretching method can be used.

As a solvent used for casting the film, there can be mentioned, for example, good solvent for acrylonitrile polymer such as dimethyl formamide (DMF), dimethyl acetoamide (DMAc), dimethyl sulfoxide (DMSO), N-methyl-2-pyrrolidone, γ-butyrolacton, etc.

While a dope shows high viscosity as the molecular weight of the polymer is increased, the concentration of the polymer for the dope with excellent film-forming property is suitably about 5 to 15 wt. % at the molecular weight of 700,000 and about 3-10 wt. % at the molecular weight of 1,600,000.

The solvent in the cast film may be removed by any of dry or wet process, but dry method is preferred for previously preventing devitrification of the film.

The drying time can be shortened as the drying temperature is higher and it is about 20 min. at 80° C. and about 2 min. at 200° C. A drying temperature exceeding 200° C. is not preferred since the film is tinted.

As a method of stretching the film according to the present invention, a known method can be utilized and monoaxial stretching can be employed for providing anisotropic strength, while biaxial stretching can be employed in other cases. Further, upon applying the biaxial stretching, simultaneous biaxial stretching is preferred since sequential biaxial stretching causes fibrilization in the first stretching direction, failing to perform succeeding stretching in the perpendicular direction or leaving anisotropy after the stretchings.

Upon conducting stretching, the film is easily stretched rather in a state where the solvent is somewhat remained in the film. The amount of the residual solvent, although it is varied depending on the kind of the solvent, is preferably about less than 100 wt. % based on the weight of the polymer.

The stretching atmosphere may either be dry or wet condition, and stretching temperature is desirably above the glass transition point although it is varied depending on the amount of residual solvent, dry heating and wet heating, respectively. Usually, the wet heat stretching can be conducted at 90°-100° C. and dry heat stretching can be conducted within a range from 120° to 200° C.

Higher strength is developed as the stretching ratio is greater and it is greater than three times, more preferably, greater than four times in the monoaxial stretching and greater than 1.5 times, preferably, two times in the biaxial stretching.

The stretching is desirably applied just after the film was heated to a predetermined temperature and the stretching speed can be increased within such a range as capable of obtaining a uniformly stretched film.

Since stretching spots or tearing may be caused if there is uneven thickness in the film, it is desirable that the film has an even thickness.

After stretching, heat setting, washing, drying, etc. may be conducted as required. The film which is not applied with heat setting can be used as a heat shrinkable film, while the film applied with heat setting provides a film having a high dimensional stability even at a high temperature. The film of the present invention can also be used for packaging materials, printing films, coating materials, laminating films for plywood or steel plates, other protection films, transparent electroconductive film substrates, heat-reflective film substrate, etc.

EXAMPLES

The present invention is to be explained specifically referring to examples.

The particular procedures that were used to determine the various characteristics and a seed polymer reported herein are as follows.

(1) Weight average molecular weight Mw:

Weight average molecular weight Mw is calculated based on $$(\eta) \times 3.35 \times 10^{-4} (Mw)^{0.72}$$

by measuring $(\eta)$ at 25° C. in DMF as a solvent (2) Molar fraction Ne of the segment of the polymerization initiator bonded to the terminal of the polymer:

The molar fraction Ne was determined by measuring nuclear magnetic resonance spectrum (NMR) at 120° C. in a 3% solution of the polymer dissolved in dimethylsulfoxide substituted with deuterium. JNM GS×400 (400 MHz) manufactured by JEOL Ltd. was used as the measuring apparatus.

In the spectrum chart, peak (A) shows a proton derived from the methylene group in the main chain of the acrylonitrile polymer and the peak (B) shows the segment of the polymerization initiator and belongs to a peak derived from the methyl group which is contained in the following structure and is attached with "*":

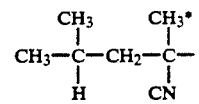

Assuming the area for the respective peaks as $S_A$ and $S_B$, Ne was calculated in accordance with the following equation:

$$Ne = \frac{S_B/3}{S_A/2}$$

(3) Breaking strength of the film:

Breaking strength of the film was measured in accordance with ASTM D638.

Oxygen permeability of the film:

Oxygen permeability of the film was measured in accordance with ASTM D-3985-8 at 25° C., 65% RH.

(5) Seed polymer:

As a seed polymer, an acrylonitrile polymer with Mw=250,000 (reduced viscosity is about 2.58) obtained by the method in which 2.34 g/min of a monomer mixture containing 98.5 molar % of acrylonitile and 1.5 molar % of methacrylic acid, 4.68 g/min of dimethylformamide containing 1 part by weight per 100 parts by weight of the monomer mixture of azobisisobutylronitrile, and 2.34 g/min of distilled water were continuously supplied to a 2 liter first polymerization tank made of glass and kept at 55° C., and the reaction product was then continuously supplied to a 5 liter second polymerization tank made of glass and kept at 60° C. 8.9 g/min of water was also supplied to the second polymerization tank. Total residence time in the first and second tanks was 7 hours. The acrylonitrile polymers obtained about 24 hours after the initiation of the polymerization were used as the seed polymer.

EXAMPLE 1

To a four necked 2 liter flask equipped with a stirrer, a thermometer, a refluxing condenser and a nitrogen introducing tube, nitrogen was introduced for 10 min. to conduct nitrogen substitution. Successively, 300 g of acrylonitrile, 300 g of dimethylacetoamide (DMAc), 600 g of water, 0.3 g of initiator (azobisisobutyrovaleronitrile) and 60 g of a seed polymer were charged and polymerization was conducted at 60° C. for 3 hours. The resultant polymer was washed with water and dried and, when Mw and Mw×Ne were measured, they were 710,000 and 250 respectively.

7 parts by weight of the resultant polymer was dissolved under heating at 90° C. into 93 parts by weight of DMAc to prepare a dope.

Then, the dope was cast on a glass plate by using a doctor blade to form a film having a thickness of 350 μm, dried in a vacuum at 80° C. for 20 min. and then peeled off from the glass plate to obtain an unstretched film.

Then, the film was loaded to a convenient type stretching device for applying monoaxial stretching by manual turning while holding both ends of the film and then monoaxially stretched by 4 times in water at 95° C. The results of evaluation for the resultant film are shown in Table 1.

Example 2

The unstretched film obtained in Example 1 was applied with simultaneous biaxial stretching by 4 times at a dry heating atmosphere at 140° C. by using a film stretcher (manufactured by T. M. Long Co.). The results for the evaluation of the resultant film are shown in Table 1.

EXAMPLE 3

To the identical polymerization apparatus with that in Example 1, 600 g of acrylonitrile, 300 g of DMAc, 600 g of water, 0.058 g of initiator (2,2'azobis(4-methoxy-2,4-dimethylvaleronitrile)) and 60 g of seed polymer were charged and polymerization was conducted at 50° C. for 2 hours. As a result, a polymer with Mw=1,600,000 and Mw×Ne=310 was obtained. 5 parts by weight of the resultant polymer was dissolved under heating at 90° C. into 95 parts by weight of DMAc, to prepare a dope.

Then, the dope was cast on a glass plate by using a doctor blade to form a film having a thickness of 250 μm, the solvent was removed for 20 min. in a dry heating atmosphere at 80° C., and then the film was peeled off from the glass plate to obtain an unstretched film of 20 μm thickness.

Then, monoaxial stretching by 4 times was conducted to the film in the same procedures as those in Example 1. The results for the evaluation of the resultant film are shown in Table 1.

EXAMPLE 4

Polymerization was conducted in the same procedures as those in Example 1 excepting for adding methyl acrylate (MA) as the monomer. As a result, a copolymer with Mw=580,000, Mw×Ne=270 and AN/MA=97.5/2.5 was obtained. 7 parts by weight of the resultant copolymer was dissolved under heating at 90° C. into 93 parts by weight of DMAc to prepare a dope.

Then, the dope was cast on a glass plate by using a doctor blade to form a film having a thickness of 400 μm, the solvent was removed in a dry heating atmosphere at 80° C. for 20 min. and then the film was peeled off from the glass plate to obtain an unstretched film of 27 μm thickness.

Then, monoaxial stretching by 6 times was applied to the film in the same method as in Example 1. The results for the evaluation of the resultant film are shown in Table 1.

EXAMPLE 5

Polymerization was conducted in the same procedures as those in Example 1 excepting for adding vinyl acetate (VA) and sodium methallyl sulfonate (MS). As a result, a copolymer with Mw=610,000, Mw×Ne=285 and AN/VA/MS=93/6.5/0.5 was obtained.

7 parts by weight of the resultant polymer was dissolved under heating at 90° C. into 93 parts by weight of DMAc to prepare a dope.

Then, the dope was cast on a glass plate by using a doctor blade to form a film having a thickness of 400 μm, the solvent was removed in a dry heating atmosphere at 80° C. for 35 min., and then the film was peeled off from the glass plate to obtain an unstretched film of 28 μm thickness.

Then, monoaxial stretching by 7 times was applied to the film in the same method as in Example 1. The results for the evaluation of the resultant film are shown in Table 1.

TABLE 1

| Example | Polymer composition | Molecular weight Mw | Mw × Ne | Thickness μm | Breaking strength kg/mm$^2$ Longitudinal | Lateral | Elongation at break % Longitudinal | Lateral | Oxygen permeability at 20° C., 65% RH cm$^3$ · cm/cm$^2$ · sec · cmHg |
|---|---|---|---|---|---|---|---|---|---|
| Example 1 | AN = 100 | 710,000 | 250 | 10 | 31 | 6 | 11 | 3 | 2.6 × 10$^{-15}$ |
| Example 2 | AN = 100 | 710,000 | 250 | 11 | 33 | 31 | 16 | 14 | 2.4 × 10$^{-15}$ |
| Example 3 | AN = 100 | 1,600,000 | 310 | 12 | 33 | 8 | 25 | 5 | 2.0 × 10$^{-15}$ |
| Example 4 | AN/MA = 97.5/2.5 | 580,000 | 270 | 12 | 32 | 2 | 10 | 3 | 5.2 × 10$^{-15}$ |
| Example 5 | AN/VA/MS = | 610,000 | 285 | 10 | 38 | 2 | 14 | 4 | 8.3 × 10$^{-15}$ |

TABLE 1-continued

| Example | Polymer composition | Molecular weight Mw | Mw × Ne | Thickness μm | Breaking strength kg/mm² Longitudinal | Breaking strength kg/mm² Lateral | Elongation at break % Longitudinal | Elongation at break % Lateral | Oxygen permeability at 20° C., 65% RH cm³·cm/cm²·sec·cmHg |
|---|---|---|---|---|---|---|---|---|---|
| Comparative Example | 93/6.5/0.5 Zexlon* | | | 40 | 6.8 | 5.2 | 85 | 140 | $4.0 \times 10^{-13}$ |

*Acrylonitrile polymer film manufactured by Mitsui Toatsu Co.

Although the invention has been described with preferred embodiments, it is to be understood that variations and modifications may be employed without departing from the concept of the invention as defined in the following claims.

What we claimed is:

1. A process for preparing an acrylonitrile polymer film having a breaking strength greater than 20 kg/mm², comprising the steps of:

(a) polymerizing acrylonitrile in a mixture of water and an organic solvent in the presence of an acrylonitrile seed polymer,
(b) washing the resultant polymer with water,
(c) dissolving the washed polymer in an organic solvent to prepare a dope,
(d) casting the dope into a film,
(e) drying the film at a temperature from about 80° C. to about 200° C. for about 2 min to about 20 min, and
(f) stretching the film at a temperature from about 90° C. to about 200° C.

* * * * *